(12) United States Patent
Kim

(10) Patent No.: US 7,499,978 B2
(45) Date of Patent: Mar. 3, 2009

(54) APPARATUS FOR RESTORING NETWORK INFORMATION FOR HOME NETWORK SYSTEM AND METHOD THEREOF

(75) Inventor: Yong Su Kim, Gyeongsangbuk (KR)

(73) Assignee: LG Electronics Inc., Seoul (KR)

( * ) Notice: Subject to any disclaimer, the term of this patent is extended or adjusted under 35 U.S.C. 154(b) by 856 days.

(21) Appl. No.: 10/790,258

(22) Filed: Mar. 2, 2004

(65) Prior Publication Data
US 2004/0208117 A1 Oct. 21, 2004

(30) Foreign Application Priority Data
Mar. 3, 2003 (KR) ...................... 10-2003-0013149

(51) Int. Cl.
G06F 15/16 (2006.01)
G06F 15/173 (2006.01)
G06F 15/177 (2006.01)
G06K 11/00 (2006.01)
G06F 3/00 (2006.01)
G06F 9/00 (2006.01)

(52) U.S. Cl. .......................... 709/208; 709/223; 714/6; 714/13; 710/19

(58) Field of Classification Search ................. 709/203, 709/208, 220–229, 248–250; 714/6, 13, 714/15, 23, 47; 710/19
See application file for complete search history.

(56) References Cited
U.S. PATENT DOCUMENTS 6,308,205 B1 * 10/2001 Carcerano et al. ........... 709/221
6,363,422 B1 * 3/2002 Hunter et al. ............... 709/224
6,389,464 B1 * 5/2002 Krishnamurthy et al. ..... 709/220
6,442,682 B1 * 8/2002 Pothapragada et al. ......... 713/1
6,505,255 B1 * 1/2003 Akatsu et al. ............... 709/239
6,772,204 B1 * 8/2004 Hansen ....................... 709/220
6,823,519 B1 * 11/2004 Baird et al. .................. 719/313
6,871,300 B1 * 3/2005 Irving .......................... 714/47
7,039,717 B2 * 5/2006 Johnson ....................... 709/237
7,099,934 B1 * 8/2006 Ewing et al. ................. 709/223
7,130,895 B2 * 10/2006 Zintel et al. .................. 709/220
7,197,049 B2 * 3/2007 Engstrom et al. ............ 370/469

(Continued)

OTHER PUBLICATIONS

"RS-232" Wikipedia Entry, Aug. 2007, pp. 1-12.*
HW-server web page. "RS-232 Signals Functional Description," 1999, pp. 1-9.*
Stewart, B. "Definitions of Managed Objects for RS-232-like Hardware Devices using SMIv2," RFC 1659, Jul. 1994, pp. 1-21.*
Vahid, Frank and Tauro, Linus. "An Object-Oriented Communication Library for Hardawre-Software CoDesign," Proceedings 5th International Workshop on Hardware/Software Codesign, Mar. 26, 1997, pp. 81-86.*

Primary Examiner—Jason D Cardone
Assistant Examiner—Melvin H Pollack
(74) Attorney, Agent, or Firm—KED & Associates, LLP

(57) ABSTRACT

An apparatus for restoring network information for a home network system and a method thereof are disclosed. The apparatus includes at least one slave having means for communicating with an external appliances; a master having means for communicating with the slave, checking a state of the slave, storing state information of the slave, and providing the state information to the slave when the slave is reset; and a home network unit connecting the communication means of the master and the slave to form a network of the master and the slave.

7 Claims, 4 Drawing Sheets

U.S. PATENT DOCUMENTS

| | | | |
|---|---|---|---|
| 7,209,945 B2 * | 4/2007 | Hicks et al. | 709/203 |
| 7,213,061 B1 * | 5/2007 | Hite et al. | 709/223 |
| 7,225,239 B2 * | 5/2007 | King et al. | 709/220 |
| 7,225,244 B2 * | 5/2007 | Reynolds et al. | 709/223 |
| 7,231,424 B2 * | 6/2007 | Bodin et al. | 709/204 |
| 2002/0124064 A1 * | 9/2002 | Epstein et al. | 709/221 |
| 2002/0133559 A1 * | 9/2002 | Arnon et al. | 709/211 |
| 2002/0152298 A1 * | 10/2002 | Kikta et al. | 709/223 |
| 2002/0194328 A1 * | 12/2002 | Hallenbeck | 709/224 |
| 2003/0018732 A1 * | 1/2003 | Jacobs et al. | 709/208 |
| 2003/0023898 A1 * | 1/2003 | Jacobs et al. | 714/15 |
| 2003/0217125 A1 * | 11/2003 | Brancati et al. | 709/220 |
| 2004/0078654 A1 * | 4/2004 | Holland et al. | 714/13 |
| 2004/0088397 A1 * | 5/2004 | Becker et al. | 709/223 |

* cited by examiner

APPARATUS FOR RESTORING NETWORK INFORMATION FOR HOME NETWORK SYSTEM AND METHOD THEREOF

BACKGROUND OF THE INVENTION

1. Field of the Invention

The present invention relates generally to a home network system, and more particularly, to an apparatus for restoring network information for a home network system and a method thereof.

2. Description of the Related Art

Currently, a home network system have been commercialized for the pursuit of convenience for control, monitoring, etc., of home appliances indoors or outdoors.

In the home network system, it is essential to construct communication lines for exchanging signals among the home appliances and a network controller for controlling the home appliances.

The home network may be constructed using separate communication lines, but it is preferable to construct the home network using power lines for supplying a power in the home.

As the technology in this field has been greatly developed, the home network system will adopt a communication method using the power line in future.

Although a separate appliance may be adopted as a network controller, the system may be constructed in a manner that any home appliance, which has a display function and connects to the Internet, such as an Internet TV, a personal computer, an Internet refrigerator, etc., is determined as a network controller, i.e., a master, and other home appliances are determined as slaves.

For example, as shown in FIG. 1, in the case that a home network is constructed among a TV (e.g., a digital TV), a washing machine, a microwave oven, an air conditioner, etc., the TV may be determined as a master and the washing machine, the microwave oven, the air conditioner, etc., may be determined as slaves.

The master and the slaves are connected to power-line communication modems, respectively, and the power-line communication modems are connected to outlets corresponding to power-line nodes A, B, C and D, so that the home network system is constructed.

Now, a communication process performed between the master and the slaves in the home network system as constructed above will be explained.

First, in the case of a normal communication as shown in FIG. 2a, the master requests a predetermined command to the slaves to start the communication, and the slaves respond to the master to complete the communication.

Meanwhile, if an error occurs during the communication as shown in FIG. 2b after the master requested the command to the slaves, the slaves fail to respond to the master. In this case, the master waits for a response from the slave for a predetermined time, and if no response is received after the predetermined time, the master re-requests the command to the slaves. If the slave responds to the master at that time, the communication is completed.

In the home network system, the master, e.g., the TV, controls various functions of the slaves including an on/off control of the power supplied to the slaves by a home network control program. The master also controls the registration and management of new home appliances, gives IDs for data communication to the slaves, and displays a picture for controlling the registered appliances.

When the power is supplied normally, the master and the slaves perform their normal operations. However, if slaves are reset due to an instantaneous power failure or any abnormal operation of the slaves and thus the slaves lose the operation-related network information, the slaves fail to remember their operation states before they are reset, and thus cannot perform their corresponding operations.

Therefore, when the power is supplied after the power failure, a user must reset the operation-related network information through the master or the slaves.

As described above, the conventional home network system has the drawbacks in that if the network information related to the operation of the slaves is lost due to an instantaneous power failure or an abnormal operation of the slaves, the user must reset the network information, and this causes inconvenience to the user. Also, as the number of slaves increases, the time required for resetting the slaves also increases.

SUMMARY OF THE INVENTION

Therefore, it is an object of the present invention to solve the problems involved in the related art, and to provide an apparatus for restoring network information for a home network system and a method thereof which can restore the network information of the slaves lost due to an instantaneous power failure or abnormal operations of the slaves.

In one aspect of the present invention, there is provided an apparatus for restoring network information for a home network system comprising at least one slave having means for communicating with an external appliances; a master having means for communicating with the slave, checking a state of the slave, storing state information of the slave, and providing the state information to the slave when the slave is reset; and a home network unit connecting the communication means of the master and the slave to form a network of the master and the slave.

In another aspect of the present invention, there is provided a method of restoring network information for a home network system comprising the steps of periodically checking a state of at least one slave connected by a network; storing state information of the slave; checking whether the slave is reset, and transmitting the state information of the slave when the slave is reset.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Wherever possible, the same reference numbers will be used throughout the drawings to refer to the same or similar parts.

Hereinafter, an apparatus for restoring network information for a home network system according to the preferred embodiment of the present invention will be described with reference to the accordingly drawings.

Figure 1:
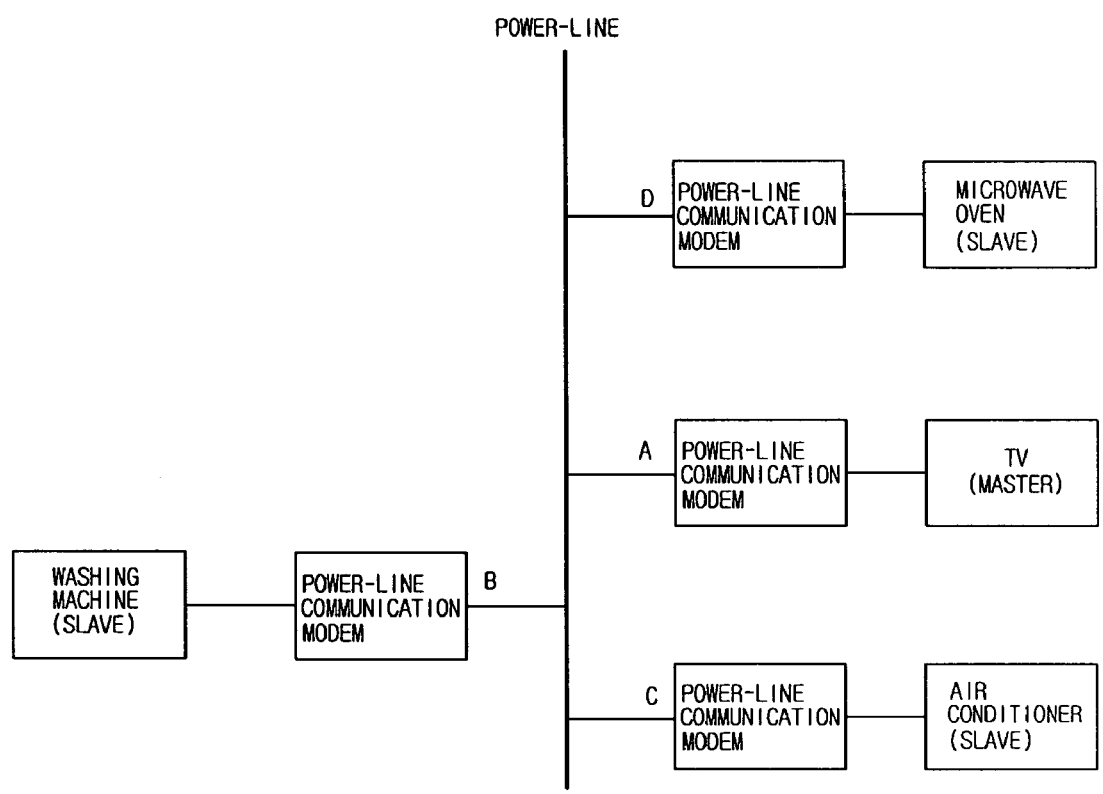
FIG. 1 is a block diagram of a general home network system.
Figure 2A:
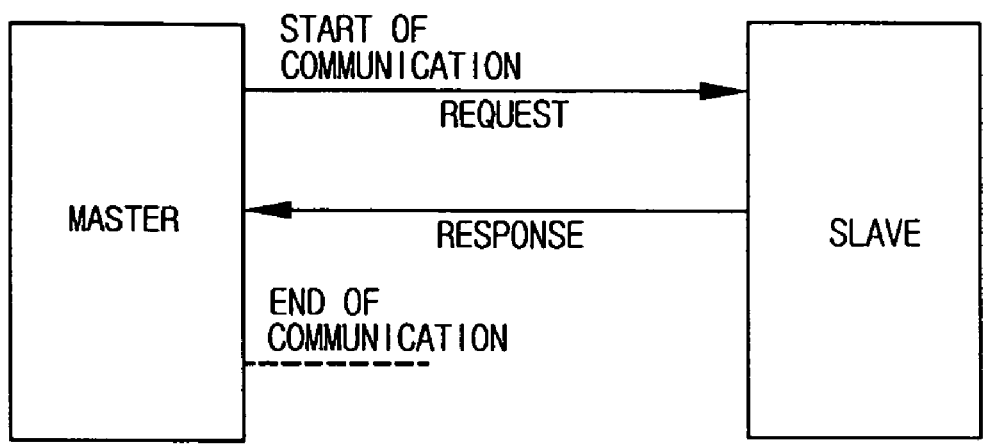
FIGS. 2a and 2b are views explaining a conventional communication process performed in the home network system of FIG. 1.
Figure 2B:
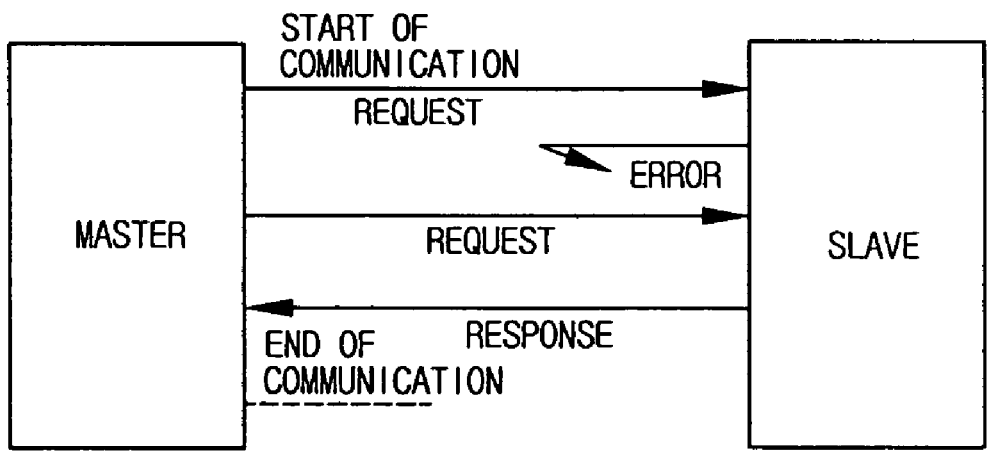
Figure 3:
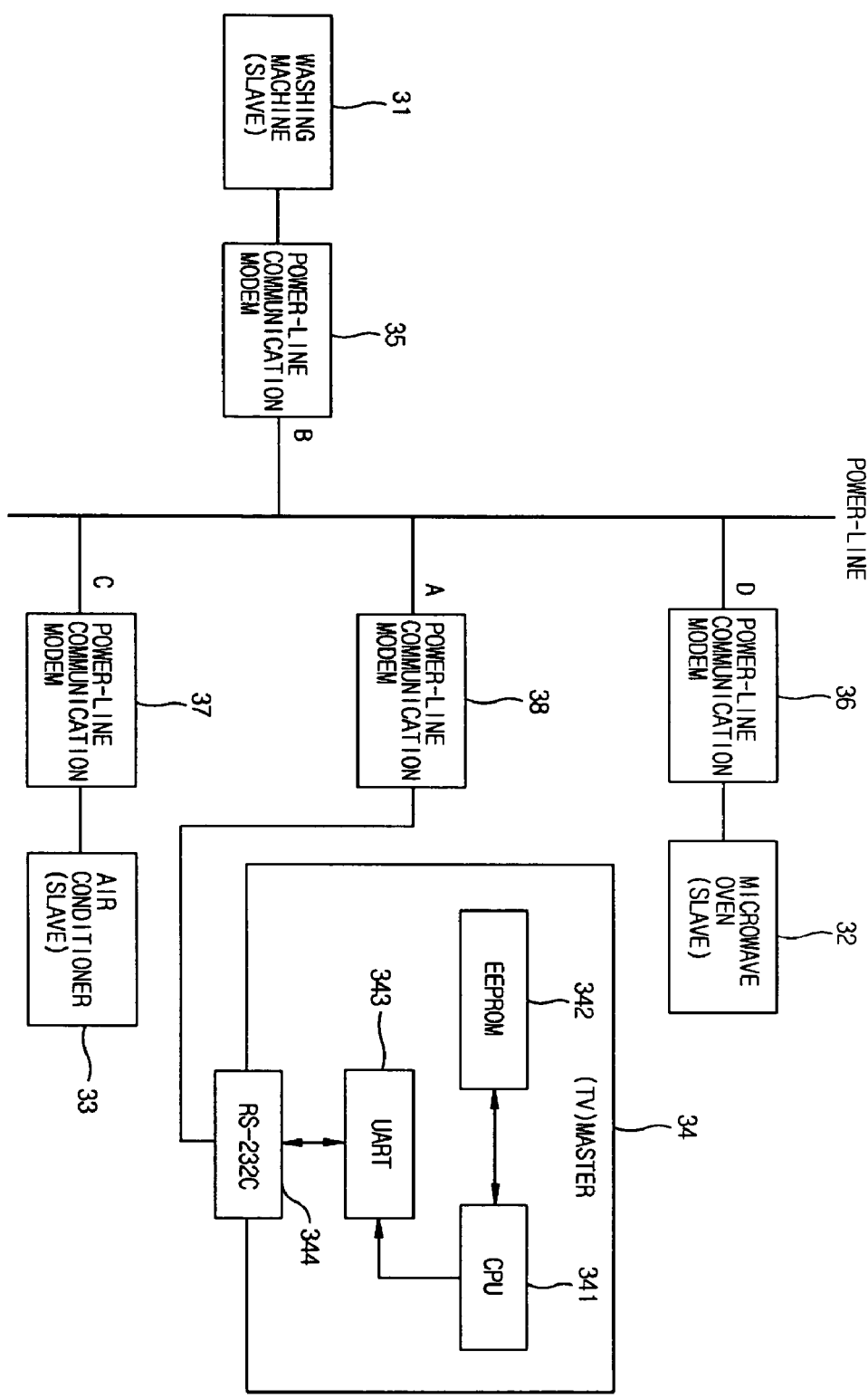
FIG. 3 is a block diagram illustrating the construction of an apparatus for restoring network information for a home network system according to the present invention.
Figure 4:
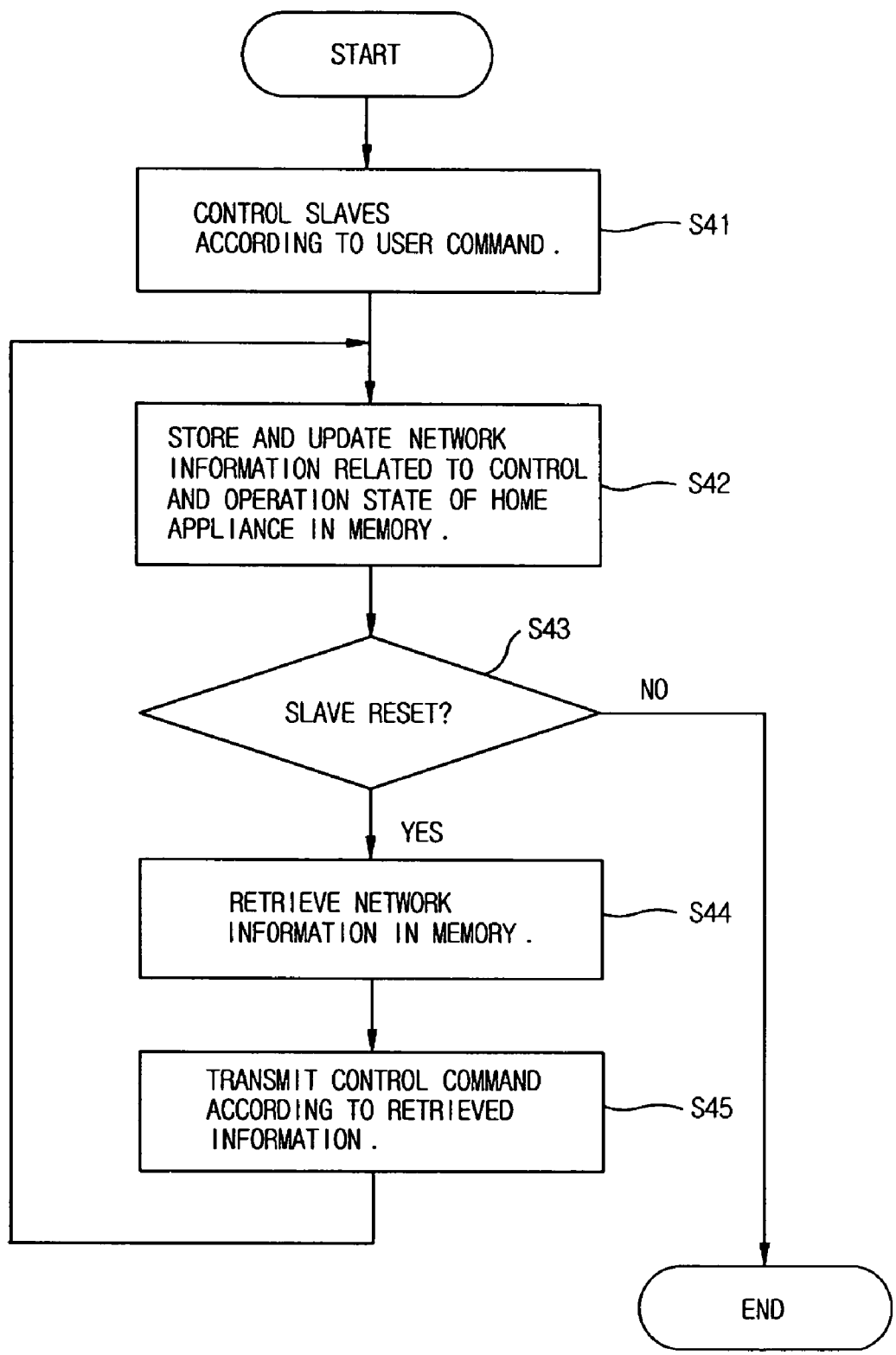
FIG. 4 is a flowchart illustrating a method of restoring network information for a home network system according to the present invention.

FIG. 3 is a block diagram illustrating the construction of an apparatus for restoring network information for a home network system according to the present invention. FIG. 4 is a flowchart illustrating a method of restoring network information for a home network system according to the present invention.

As shown in FIG. 3, the apparatus for restoring network information for a home network system according to the present invention includes slaves 31,32 and 33 having RS-232C ports, a master for storing and updating network information of the slaves 31,32 and 33 in a non-volatile memory, checking whether the slaves 31,32 and 33 are reset, and restoring the network information of the corresponding slave stored in the non-volatile memory if any one of the slaves 31,32 and 33 is reset, and power-line communication modems 35,36,37 and 38 for a network communication between the master 34 and the slaves 31,32 and 33.

In this case, the master 34 includes a non-volatile memory, that is an EEPROM (erasable and programmable read only memory) 342 for maintaining the stored data irrespective of the power failure, a CPU 341 that performs a basic control operation of the home networking including giving IDs to the slaves, monitoring and controlling of the operation state, storing network information such as the control, monitoring, etc., of home appliance in the EEPROM 342, and restoring the network information of the slave when the power is supplied again after the reset of the slave, and a UART (Universal Asynchronous Transmitter/Receiver) 343 and an RS-232C port 344 for the CPU 341 to perform a network communication through a power-line communication modem.

A method of restoring the network information performed by the apparatus of FIG. 3 according to the present invention will now be explained with reference to FIG. 4.

First, the master 34, that is the TV, is connected to the power line through the RS-232C port 344 and the power-line communication modem 38, and the slaves 31,32 and 33 are also connected to the power lines through the RS-232Cs port and the power-line communication modems 35,36 and 37.

The master 34 communicates with the slaves, registers the slaves by giving IDs to the slaves, and checks the operation states of the slaves.

Then, the master 34 controls the slaves according to a user's control command (step S41).

Specifically, the master 34 stores and updates by slaves the network information related to the control and the operation states of the slaves in the EEPROM 342 (step S42).

In this case, the network information related to the control and the operation states of the slaves includes control information inputted by the user, monitoring information and information related to the operation state of the slaves. The update of the network information is performed whenever the control information, the monitoring information or the operation-state-related alarming information is inputted.

Then, the master 34 checks whether the slaves 31,32 and 33 are reset due to the power failure or an abnormal state of the slaves S43.

At this time, the master 34 grasps whether the slaves 31,32 and 33 are reset in a manner that the master 34 periodically checks the states of the slaves 31,32 and 33, and the slaves 31,32 and 33 periodically inform their states to the master 34, too.

If all or some of the slaves 31,32 and 33 are reset due to the power failure or their abnormal states as a result of checking, the master 34 retrieves the network information stored in the EEPROM 342.

Then, the master 34 transmits the network information related to the operation states before the power failure to the reset slaves.

Therefore, the reset slaves, which received the network information from the master 34, are restored to their original states and perform their operations.

For example, it is assumed that all of the slaves 31,32, and 33 are reset due to the power failure while a washing machine 31 performs a rinsing operation. If the power is supplied again, the washing machine 31 receives the network information from the master, which corresponds to a command for the washing machine 31 to perform the rinsing operation.

Consequently, after the power is supplied again, the washing machine 31 performs the rinsing operation according to the network information related to the latest state of the washing machine receives from the master 34.

If the network information related to the latest state is not transmitted from the master 34, the washing machine 31 does not resume the operation unless the user inputs a new command.

After the slaves 31,32 and 33 are restored to their latest operation states, the master 34 prepares for a further possible reset by repeating the steps of storing and updating of the network information.

As described above, the apparatus for restoring network information for a home network system and the method thereof according to the present invention has the effects in that it restores the slaves to their latest states and enables the slaves to perform their operations by storing the states of the slaves even if the slaves are reset. Therefore, it is not continue required for the user to set the operations of the slaves if the slaves are reset, and this provides convenience in use.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A home network system for restoring network information, the system comprising:
   at least one slave for outputting a current operation state information indicative of at least one operation state of said at least one slave, the at least one operation state being variable after powering said at least one slave;
   a master including a communication module connected to said at least one slave, the master for periodically receiving the current operation state information output from said at least one slave;
   a memory storing the received operation state information of said at least one slave; and a processor checking the state of said at least one slave and transmitting to said at least one slave the stored operation state information when the master determines that said at least one slave has been reset, wherein said at least one slave is restored to a latest state and performs an operation according to the operation state information transmitted from the master.

2. The system of claim 1, wherein when power to said at least one slave is interrupted, said at least one slave is set to an operating state according to the received operation state information and said at least one slave outputs operational state information indicative of the set operating state.

3. The system of claim 1, wherein said at least one slave is a home appliance provided with an RS-232C type communication module for communicating with said master via power-line communication modems connected to a set of power lines.

4. A method of restoring network information in a home network system including at least one slave, communicating with a master having a non-volatile memory, the method comprising:

outputting, from the at least one slave, operational state information indicative of at least one operation state of the at least one slave the at least one operation state being variable after powering the at least one slave;

periodically receiving at the master, the operation state information output from the at least one slave to determine a current operation state of the at least one slave and to determine whether the at least one slave has been reset;

storing, in the non-volatile memory, the operation state information of the at least one slave; and transmitting the stored operation state information from the master to the at least one slave when it is determined that the at least one slave has been reset, wherein said at least one slave is restored to a latest state and performs an operation according to the operation state information transmitted from the master.

5. The method of claim 4, wherein said master is a home appliance provided with a universal asynchronous transmitter/receiver and an RS-232C type communication module for communicating with said at least one slave via power-line communication modems connected to a set of power lines.

6. A television receiver serving as a master device for restoring network information in a home network system including at least one slave communicating with the master device, the television receiver comprising:

a communication module, connected to the at least one slave, for periodically receiving the operation state information from the at least one slave;

memory for storing the operation state information of the at least one slave; and a processor for periodically checking a current operation state of the at least one slave to determine whether the at least one slave has been reset and the processor for transmitting the stored operation state information to the at least one slave, when it is determined that the at least one slave has been reset, wherein said at least one slave is restored to a latest state and performs an operation according to the operation state information transmitted from the master.

7. The television receiver of claim 6, wherein the communication module is an RS-232C type communication module for communicating with the at least one slave via power-line communication modems connected to a set of power lines.

* * * * *